(12) United States Patent
Hwang et al.

(10) Patent No.: US 8,075,644 B2
(45) Date of Patent: Dec. 13, 2011

(54) CATALYTIC LIQUID FUEL

(75) Inventors: Bing-Joe Hwang, Taipei (TW);
Jing-Shan Do, Taipei (TW); Shao-Kang Hu, Taipei (TW); Ching-Hsiang Chen, Taipei (TW); Kuo-Jung Wang, Taipei (TW); Sakkarapalayam Murugesan Senthil Kumar, Taipei (TW); Loka Subramanyam Sarma, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 667 days.

(21) Appl. No.: 11/759,934

(22) Filed: Jun. 8, 2007

(65) Prior Publication Data

US 2008/0066376 A1     Mar. 20, 2008

(30) Foreign Application Priority Data

Jun. 9, 2006   (TW) .............................. 95120470 A

(51) Int. Cl.
*C10L 1/12* (2006.01)
*C10L 1/18* (2006.01)
(52) U.S. Cl. ................ 44/905; 44/321; 44/354; 44/451
(58) Field of Classification Search ............... 44/354, 44/300, 457, 451, 436, 399, 905; 423/22, 423/69, 20, 89; 429/193, 502, 503, 506, 429/523
See application file for complete search history.

(56) References Cited

U.S. PATENT DOCUMENTS

| | | | |
|---|---|---|---|
| 3,178,315 A | | 4/1965 | Worsham |
| 3,350,228 A | | 10/1967 | Shropshire |
| 4,513,065 A | * | 4/1985 | Adlhart ..................... 429/422 |
| 5,951,722 A | * | 9/1999 | Sanders et al. ................ 44/354 |
| 6,534,033 B1 | * | 3/2003 | Amendola et al. ......... 423/648.1 |
| 2002/0083640 A1 | * | 7/2002 | Finkelshtain et al. .......... 44/314 |
| 2003/0157018 A1 | * | 8/2003 | Zaluski et al. ............. 423/648.1 |
| 2003/0157393 A1 | * | 8/2003 | Choi et al. ...................... 429/40 |
| 2004/0131921 A1 | * | 7/2004 | Landreth et al. ................ 429/46 |
| 2006/0213120 A1 | * | 9/2006 | Sklyarsky et al. .............. 44/436 |
| 2008/0286621 A1 | * | 11/2008 | Rosenzweig et al. ........... 429/17 |

FOREIGN PATENT DOCUMENTS

| | | |
|---|---|---|
| EP | 1930973 | 6/2008 |
| JP | 2004-193034 | 7/2004 |
| JP | 2005-534742 | 11/2005 |
| WO | 2004052538 | 6/2004 |
| WO | 2007100546 | 9/2007 |

OTHER PUBLICATIONS

Wang et al., Effect of rare earth ions on electro-oxidation of methanol, XP002491272 retrieved from Chenical Abstracts database accession No. 148: 36369; Jan. 3, 2008, Columbus, Ohio, US.

"Office Action of Japan Counterpart Application", issued on Mar. 8, 2011, p. 1-p. 4.

* cited by examiner

*Primary Examiner* — Ellen McAvoy
*Assistant Examiner* — Pamela H Weiss
(74) *Attorney, Agent, or Firm* — Jianq Chyun IP Office

(57) ABSTRACT

A catalytic liquid fuel is described, including a liquid fuel added with at least one kind of catalytic ion or its salt to improve the oxidation activity thereof. The liquid fuel includes at least an organic liquid fuel or a reducing agent or their mixture. The oxidation activity of the fuel can be enhanced by adding an extremely low concentration of the catalytic ion or it salt. The catalytic liquid fuel also can overcome problems like low oxidation activity, surface poisoning and fading of catalysts.

6 Claims, 1 Drawing Sheet

CATALYTIC LIQUID FUEL

CROSS-REFERENCE TO RELATED APPLICATION

This application claims the priority benefit of Taiwan application serial no. 095120470, filed Jun. 9, 2006. All disclosure of the Taiwan application is incorporated herein by reference.

BACKGROUND OF THE INVENTION

1. Field of the Invention

This invention relates to the liquid fuel technology, and more particularly to a catalytic liquid fuel added with a catalyst for overcoming problems like low oxidation activity, surface poisoning and fading of the catalysts.

2. Description of the Related Art

The development in human technology has led to a great economical growth, but the accompanying mass production and consumption can't be supported by the recovery capability of the natural environment and result in severe pollution, sharp declines in energy resources and even threats to sustainable development of humans. The hottest issues nowadays include the progressive global warning and depletion of petroleum. To avoid energy crisis caused by insufficient petroleum storage as well as high risk of nuclear cleavage systems and the resulting nuclear waste, all governments in the world are giving every effort to develop more friendly energy technologies. Some alternative energy sources have been provided so far, such as solar cell, wind power generator and fuel cell. All the alternative energy sources not only can replace current electricity generation systems based on petroleum, but also feature low noise and high cleanness in general. Such affinities to the nature are important indicators for the advanced energy utilization of humans in the future.

Among the new energy technologies, the fuel cell is particularly promising. A fuel cell can convert chemical energy directly to electric energy without the limitation of the Carnot cycle to be more efficient in electricity generation than traditional methods, and also has the merits of low noise, low pollution and wide application. Though the fuel cell was initially reported by Grove in 1839, it is firstly applied to the life support systems of the Apollo and Gemini spacecrafts in the 1960's. With the high efficiency and low pollution, the fuel cell has become the most promising energy system in current world where environment protection and energy utilization efficiency are appreciated. The other electricity generation methods, such as waterpower, thermal power, nuclear power, wind power and solar power electricity generations, have respective drawbacks, such as, limitations from the natural conditions (for waterpower, wind power and solar power), pollution (for thermal power) and certain risk (for nuclear power). The fuel used in a fuel cell is traditionally hydrogen, which is oxidized to form water that causes no pollution. Further, since the other electricity generation systems are all centralized ones needing long-range electricity transmission, much energy is lost in the electricity transmission. On the contrary, a fuel cell is a distributed electricity generation system requiring no long-range electricity transmission, and the fuel cell stack can be scaled to satisfy various applications from a 3C product to a community or a large-scale power station. Certain types of fuel cells can also be applied to vehicles to reduce exhausts from the vehicles mainly using gasoline as the fuel, so that the environment is protected and the quality of life is improved.

Among various types of fuel cells, the direct methanol fuel cell (DMFC) is ought to be the most promising one, because methanol is cheaper, safe and easy to store and deliver, and is higher in the electrochemical activity as being an alcohol having the least carbon number. The DMFC was firstly studied in the 1950's, and was practicalized to serve as power sources of lighthouses and rain gauges in the 1970's after the electrodes were modified unceasingly and ion-exchange membranes were developed. In presence of the catalyst on the electrode, methanol is electrochemically reacted and oxidized to $CO_2$ and $H_2O$. Therefore, the DMFC suitably serves as a mobile power source for an electric car or an electric motorcycle, or as a portable power source for a cellular phone or a notebook computer, and has become a trend for future mobile and portable power sources as well as a target of study in many countries.

In a DMFC system, the anode catalyst material usually includes platinum (Pt). However, methanol is incompletely oxidized on platinum at low temperature to produce carbon monoxide (CO), which is adsorbed on the platinum surface to poison the same and reduce its oxidation capability so that the electrochemical performance of the anode material is significantly lowered.

For a platinum catalyst electrode is easily poisoned due to incomplete oxidation of methanol, the development of the platinum-only catalysts is limited. Hence, how to improve the tolerance of the catalyst to carbon monoxide has become a major issue, and many researchers turned to study double-metal catalysts and multi-metal catalysts. However, a double- or multi-metal catalyst suffers from problems like metal dissolution, and is therefore limited in the application.

Conventional fuel cells using a liquid fuel mostly use Pt-catalyst or Pt-catalyst modified by one or more (transition) metals, such as Pt/C, bimetallic catalysts like PtRu/C or PtCo/C or multi-metallic catalysts like PtRuSn, PtRuTi or PtRuMo, or use a transition metal compound to catalyze the liquid fuel and produce an oxidation current. However, these catalysts still suffer from a certain degree of CO-poisoning as well as dissolution of the modifying metal like Ru, Ti, Co, Zn or Mo, so that the catalytic activity ratio of the catalyst is gradually lowered with time.

SUMMARY OF THE INVENTION

Accordingly, this invention provides a catalytic liquid fuel that can overcome problems like low oxidation activity, surface poisoning and fading of the catalysts.

The catalytic liquid fuel of this invention includes a liquid fuel that is added with at least one kind of catalytic ion or its salt to improve the oxidation activity thereof.

This invention also provides a fuel cell that uses the above catalytic liquid fuel.

The catalytic ion present in the liquid fuel can improve the oxidation activity of the liquid fuel, so that certain problems in the prior art like low catalytic activity, surface poisoning and fading of the catalysts are prevented with this invention.

It is to be understood that both the foregoing general description and the following detailed description are exemplary, and are intended to provide further explanation of the invention as claimed.

DESCRIPTION OF THE PREFERRED EMBODIMENTS

Figure 1:
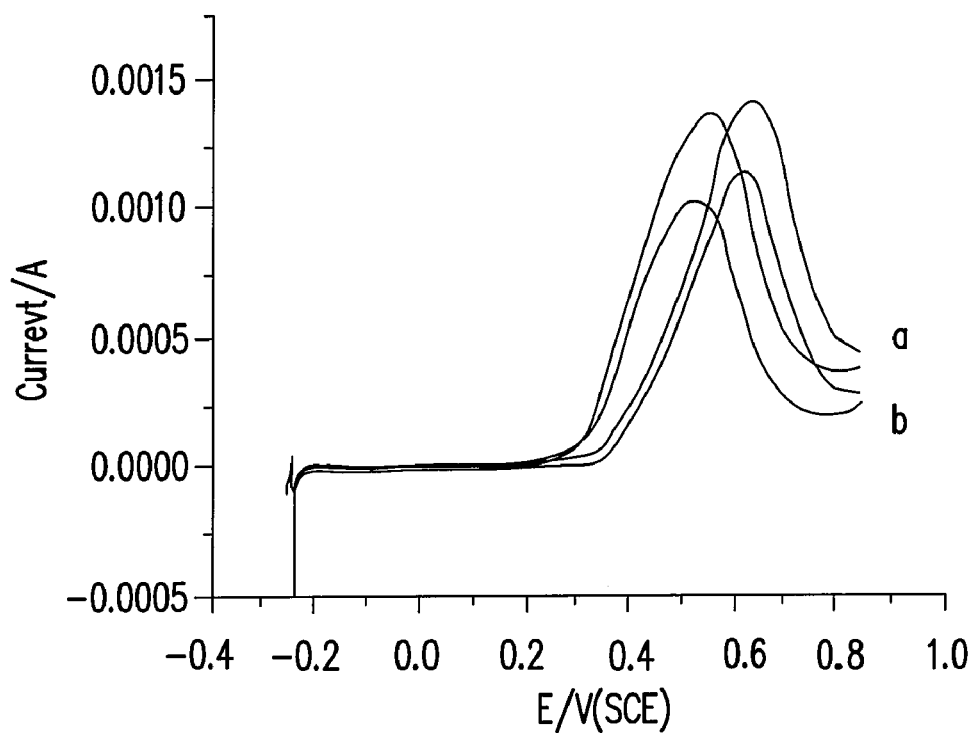
FIG. 1 plots the cyclic voltammetry curves of (a) a methanol solution added with $SnCl_2$ and (b) a methanol solution not added with a catalytic ion or its salt.

It is noted that the following embodiments are intended to further explain this invention but not to limit the scope of this invention.

In some embodiments, the above catalytic ion includes a metal ion. The metal may be selected from the group consisting of tin (Sn), ruthenium (Ru), titanium (Ti), cobalt (Co), zinc (Zn) and molybdenum (Mo). The salt of the catalytic ion may be selected from the group consisting of oxide, hydroxide, nitride, oxynitride, sulfide, cyanide, halides, organic acid salts and inorganic acid salts of the metal. In a preferred embodiment, the salt includes a chloride salt.

The liquid fuel may be selected from the group consisting of organic liquid fuels, liquid fuels containing a reducing agent, and combinations thereof. The organic liquid fuels may include alkyl alcohols of $C_1$-$C_5$, organic acids of $C_1$-$C_5$ and combinations thereof, wherein the alkyl alcohols of $C_1$-$C_5$ include methanol, ethanol, propyl alcohol and so forth, and methanol is more preferred among them. The reducing agent may be selected from the group consisting of $N_2H_4$, $NaBH_4$, $LiBH_4$ and combinations thereof.

In addition, the salt of the catalytic ion may be dissociable in an aqueous solution or in an organic molecular solution. The addition amount of the catalytic ion is not particularly limited, and may be a trace amount in consideration of the cost if only the oxidation activity can be improved. The addition amount depends on the species of the catalyst, and is preferably just sufficient to improve the oxidation activity of the liquid fuel. For example, when $RuCl_3$ is added into a 5% methanol aqueous solution as a liquid fuel in an extremely low concentration of $10^{-9}$ M, the oxidation current of methanol on the Pt/C electrode can be increased from 1.0 mA to 5.0 mA.

Moreover, a fuel cell of this invention can use any of the above catalytic liquid fuels according to the embodiments of this invention. The structure of such a fuel cell can be any conventional structure that allows a liquid fuel to be used, and is exemplified in the following examples.

EXAMPLES

It is noted that the following examples are intended to further explain this invention but not to limit the scope of this invention.

Example 1

At first, 0.0031 g of Johnson-Matthey Pt-black powder is dispersed in 500 μL of a diluted 0.5 wt % Nafion solution, and then 7 μL of the resulting mixture is dropped on glassy carbon disks (GCD) each having a surface area of 0.1964 cm². The glass carbon disks are then dried in an oven at 80° C. to form electrodes. A 5% methanol solution is added with $SnCl_2$ and sulfuric acid in concentrations of $10^{-9}$ M and 0.5 M, respectively, while another 5% methanol solution as a control sample is added with sulfuric acid in a concentration of 0.5 M but no catalytic ion or its salt. For each methanol solution, a Pt-black/GCD electrode, a Pt-electrode and a normal calomel electrode, respectively as a working electrode, a counter electrode and a reference electrode, are placed therein to make a cyclic voltammetry curve within a range of −0.24 V to 0.85 V in a scanning rate of 5 $mVs^{-1}$. Respective cyclic voltammetry curves of (a) the methanol solution added with $SnCl_2$ and (b) the control sample are plotted in FIG. 1.

As shown in FIG. 1, by adding $SnCl_2$ as a salt providing a catalytic ion, the oxidation of methanol can be increased from 0.001 A to 0.0013 A, i.e., increased by about 30%, indicating that $SnCl_2$ as a salt providing a catalytic ion can improve the oxidation activity of an organic liquid fuel effectively.

Example 2

This example is similar to Example 1 except that $RuCl_3$ is used in replacement of $SnCl_2$. Respective cyclic voltammetry curves of (a) the methanol solution added with $RuCl_3$ and (b) the control sample are plotted in FIG. 2.

Figure 2:
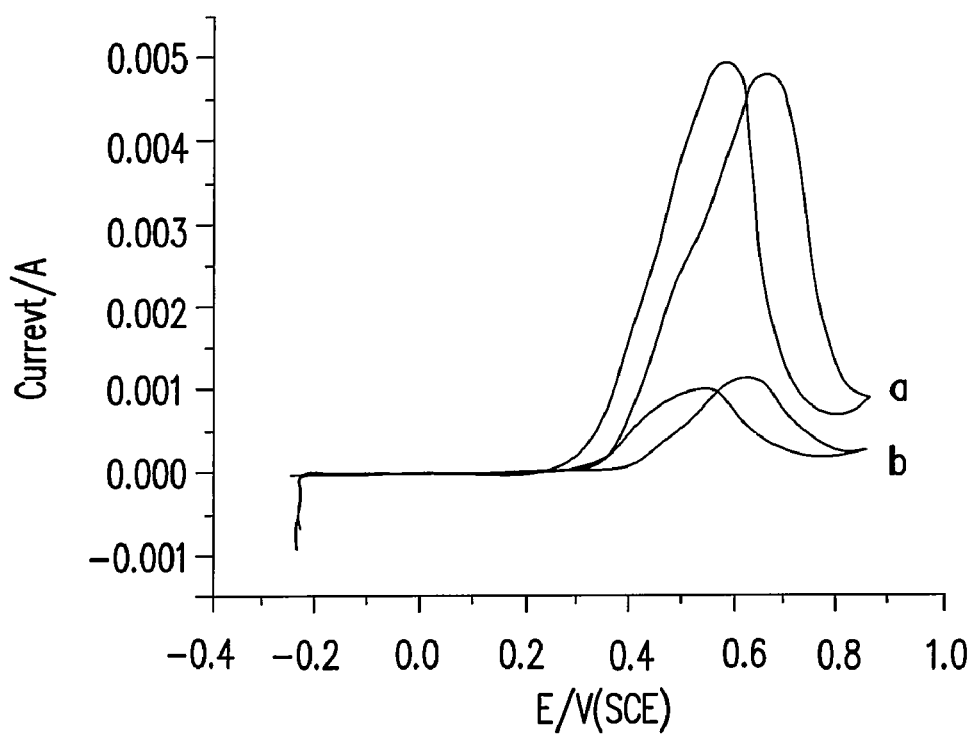
FIG. 2 plots the cyclic voltammetry curves of (a) a methanol solution added with $RuCl_3$ and (b) a methanol solution not added with a catalytic ion or its salt.

As shown in FIG. 2, by adding $RuCl_3$ as a salt providing a catalytic ion, the oxidation of methanol can be increased from 0.001 A to 0.005 A, i.e., increased by about 400%, indicating that $RuCl_3$ as a salt providing a catalytic ion can improve the oxidation activity of an organic liquid fuel effectively.

Since the catalytic ion present in the liquid fuel can improve the oxidation activity of the liquid fuel, certain problems in the prior art like low catalytic conversion ratio, surface poisoning and fading of the catalysts can be prevented with this invention.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A catalytic liquid fuel, comprising an organic liquid fuel added with at least one kind of inorganic catalytic ion or its salt to improve an oxidation activity of the organic liquid fuel, and containing no inorganic reducing agent, wherein the inorganic catalytic ion comprises a metal ion, and the metal is selected from the group consisting of Sn, Ru, Ti, Co and Mo.

2. The catalytic liquid fuel of claim 1, wherein the salt of the inorganic catalytic ion is selected from the group consisting of oxide, hydroxide, nitride, oxynitride, sulfide, cyanide, halides, organic acid salts and inorganic acid salts of the metal.

3. The catalytic liquid fuel of claim 2, wherein the salt comprises a chloride salt.

4. The catalytic liquid fuel of claim 1, wherein the organic liquid fuel is selected from the group consisting of alkyl alcohols of $C_1$-$C_5$, organic acids of $C_1$-$C_5$ and combinations thereof, wherein the alkyl alcohols of $C_1$-$C_5$ include methanol, ethanol and propyl alcohol.

5. The catalytic liquid fuel of claim 1, wherein the salt of the inorganic catalytic ion is dissociable in an aqueous solution or in an organic molecular solution.

6. The catalytic liquid fuel of claim 1, wherein the inorganic catalytic ion or its salt is added in a concentration of $10^{-9}$ M or more.

* * * * *